March 26, 1963  J. H. POIRIER  3,083,336
DIRECT READING, 360 DEGREE PHASE METER
Filed July 12, 1960

INVENTOR.
JULES H. POIRIER
BY
Knox & Knox

United States Patent Office 3,083,336
Patented Mar. 26, 1963

3,083,336
DIRECT READING, 360 DEGREE PHASE METER
Jules Hubert Poirier, Lemon Grove, Calif., assignor to Ryan Aeronautical Co., San Diego, Calif.
Filed July 12, 1960, Ser. No. 42,361
7 Claims. (Cl. 324—83)

The present invention relates generally to phase meters and more particularly to a direct reading, 360 degree phase meter.

The primary object of this invention is to provide a phase meter which indicates directly the phase angle between two sine wave voltages of the same frequency, over a wide frequency range.

Another object of this invention is to provide a phase meter utilizing an automatically tuned phase comparator circuit to indicate the quadrant and a second, intercoupled phase comparator to indicate polarity and amplitude of a voltage being measured in comparison with a reference voltage, the outputs of the comparators being applied to a suitable meter or indicator to provide direct phase angle reading.

A further object of this invention is to provide a phase meter in which the tunable phase comparator circuit uses a closed servo loop to obtain a 90 degree phase shift of constant amplitude over a wide frequency range.

Finally, it is an object to provide a 360 degree phase meter of the aforementioned character which is simple and convenient to assemble and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
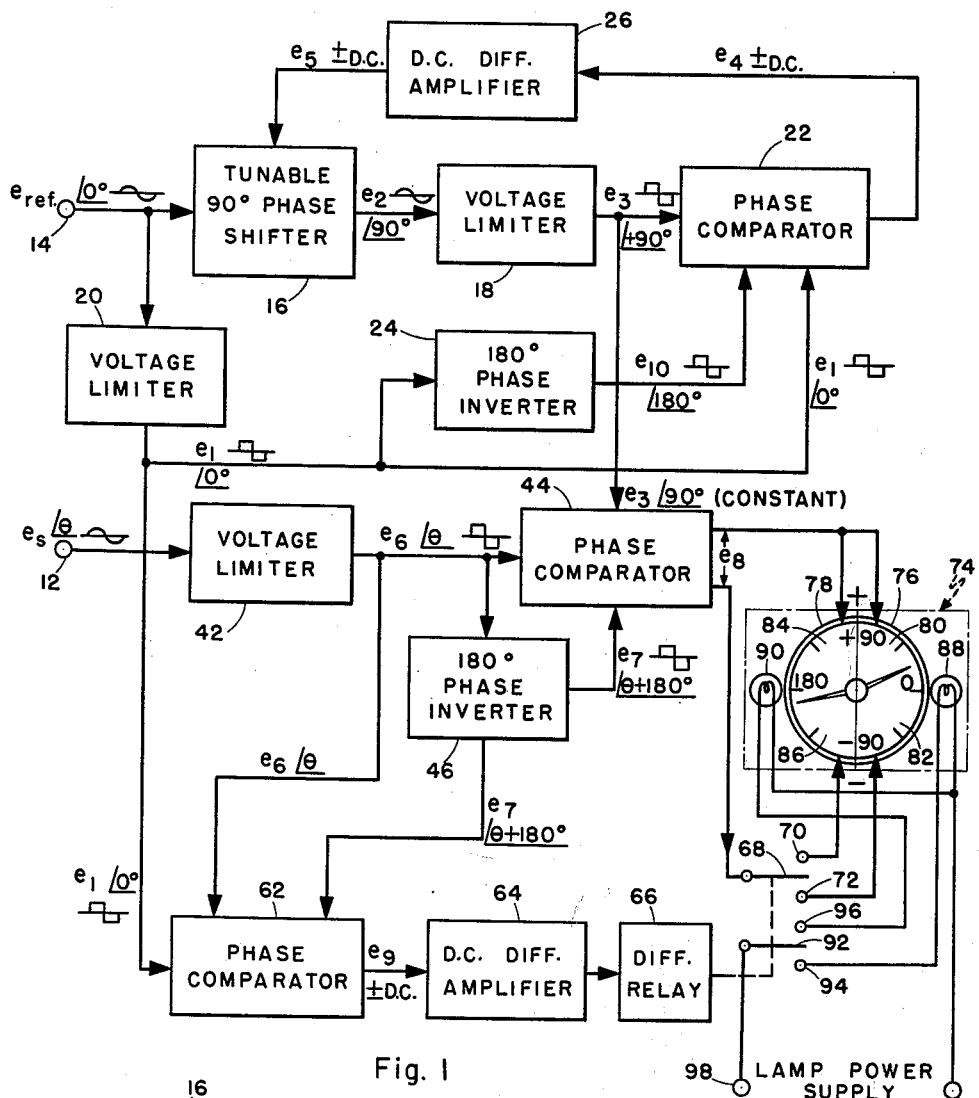
FIGURE 1 is a block diagram of the complete phase meter circuit.

The circuit as illustrated in FIGURE 1 has a signal input 12, to which is applied a sine wave voltage $e_s$, and a reference input 14, to which is applied a reference sine wave voltage $e_r$ of known phase or effectively zero phase angle, with which the phase of the signal voltage is to be compared. The reference input 14 is connected to a tunable 90 degree phase shifter 16 to provide a sine wave voltage $e_2$ which is 90 degrees out of phase with the input, this voltage $e_2$ being applied to a voltage limiter 18 which provides a square wave voltage $e_2$, also 90 degrees out of phase with the input. The reference voltage $e_r$ is also applied directly to a voltage limiter 20, the output of which is a square wave voltage $e_1$ of zero phase.

From voltage limiter 18 the voltage $e_3$ is applied to a phase comparator 22, the voltage $e_1$ from voltage limiter 20 being applied to said phase comparator directly and also through a 180 degree phase inverter 24, which provides a voltage $e_{10}$ 180 degrees out of phase with $e_1$, but still square wave. The three voltages $e_1$, $e_3$ and $e_{10}$ are compared in the phase comparator 22, the resultant output being a D.C. voltage $e_4$ which is zero as long as the voltage $e_3$ is exactly 90 degrees out of phase with reference voltage $e_1$. If, however, the voltage $e_3$ varies from a 90 degree phase shift, the D.C. voltage $e_4$ will vary in polarity and amplitude, this voltage being fed through a D.C. differential amplifier 26, which provides a D.C. voltage $e_5$ to tune the phase shifter 16 and correct any phase deviation.

Figure 2:
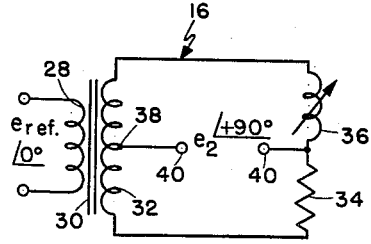
FIGURE 2 is a schematic wiring diagram of a tunable 90 degree phase shifter suitable for use in the circuit.

One suitable circuit for the phase shifter 16 is illustrated in FIGURE 2, in which the reference voltage $e_r$ is applied to the input winding 28 of a transformer 30, the output winding 32 thereof being connected to a resistor 34 and a variable inductor 36 in series. The output winding 32 has a center tap 38 which is coupled to one of a pair of output terminals 40, the other of which is connected to the junction of resistor 34 and inductor 36. The variable inductor 36 controls the phase shift and may be actuated by a suitable servo motor or similar means driven by the variable D.C. voltage $e_5$, the closed loop servo system through phase comparator 22 and amplifier 26 maintaining a stable 90 degree phase shift regardless of frequency changes. Other phase shifter circuits may be employed, that illustrated merely being an example.

Figure 3:
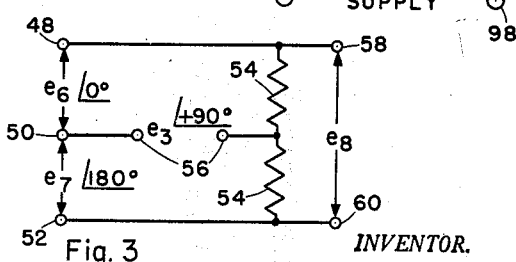
FIGURE 3 is a schematic wiring diagram of a phase comparator.

The sine wave signal voltage $e_s$ at input 12 is fed through a voltage limiter 42, the output of which is a square wave voltage $e_6$, this voltage being applied to a phase comparator 44. The voltage $e_6$ is also fed through a phase inverter 46 to provide a square wave voltage $e_7$ which is 180 degress out of phase with the signal input, this voltage $e_7$ also being applied to the phase comparator 44. In addition, the phase comparator 44 receives the voltage $e_3$ which is 90 degrees out of phase with the reference voltage, the three voltages being compared in the phase comparator, a typical circuit for which is illustrated in FIGURE 3.

In this circuit the voltage $e_6$ is applied across a pair of input terminals 48 and 50, while the voltage $e_7$ is applied between terminal 50 and a third input terminal 52. Terminals 48 and 52 are coupled to the opposite ends of a pair of resistors 54 in series, the common terminal 50 being connected, across a pair of input terminals 56 which receive voltage $e_3$, to the junction of said resistors. The output terminals 58 and 60 at opposite ends of resistors 54 carry a voltage $e_8$ whose polarity depends on what quadrant the unknown phase angle is in and whose amplitude depends on the magnitude of the angle, the polarity being positive when the angle is in the first or second quadrant and negative when the angle is in the third or fourth quadrant. The voltage is zero at zero phase angle difference, maximum positive when the angle is a positive 90 degrees and maximum negative when the angle is a negative 90 degrees. The phase comparator circuit is included for clarification of operation.

The square wave reference voltage $e_1$ of zero phase is applied to a further phase comparator 62, together with voltage $e_6$ of unknown phase and voltage $e_7$, which is 180 degrees out of phase with $e_6$. Phase comparator 62 has a differential D.C. output voltage $e_9$ which is passed through a differential amplifier 64 to a differential relay 66. The relay has a moving contact 68 connected to output terminal 60 and a pair of fixed contacts 70 and 72 to be selectively engaged by operation of the relay.

The indicating instrument 74 is illustrated as a pair of meters 76 and 78 each having a 180 degree dial, the meters being mounted in a suitable manner to provide a 360 degree representation. Meter 76 contains the first and fourth quadrants 80 and 82, while meter 78 contains the second and third quadrants 84 and 86, respectively. Output 58 is connected directly to both the first and second quadrants 80 and 84, the fixed contacts 70 and 72 being connected to the third and fourth quadrants 86 and 82.

Voltage $e_9$ is positive when the phase angle is in the first or fourth quadrant and is negative when the phase angle is in the second or third quadrant. Thus the polarity of voltage $e_8$ determines whether the phase angle to be measured is in the first and second quadrant pair or the third and fourth quadrant pair, while the polarity of voltage $e_9$, by actuation of relay 66, determines which is the correct quadrant of the particular pair. For example, if the voltage $e_8$ is positive, the phase angle is in either the first or second quadrants 80 or 84 and if the voltage $e_9$ is also positive, the phase angle is in the first or fourth quadrant 80 or 82, the common quadrant being the first quadrant 80, in which the phase angle therefore lies. The angular position of the indicating needle in the selected quadrant is dependent on the amplitude of voltage $e_8$, the combination providing direct indication of the difference in phase angle of signal voltage $e_s$ as compared to reference voltage $e_r$, on a 360 degree scale.

To ensure proper reading, the indicating instrument 74 is provided with a pair of lamps 88 and 90 for individual illumination of meters 76 and 78, respectively. The relay 66 has an additional moving contact 92 and a pair of fixed contacts 94 and 96, through which lamps 88 and 90 are connected to power supply terminals 98; action of the relay operating the proper lamp in conjunction with the particular meter. In this manner, the applicable meter is clearly identified.

The arrangement of a pair of 180 degree meters as illustrated is a convenient method of utilizing readily available components. However, other indicating means may be used, such as a full 360 degree dial driven by a servo motor operated by the differential D.C. voltages $e_8$ and $e_9$. Still other means will be apparent to those skilled in the art, the basic circuit providing the outputs necessary to achieve such results.

The circuit is characterized by the use of one phase comparator to determine whether the phase angle to be measured is in the first and fourth quadrant pair or the second and third quadrant pair, another phase comparator being used to determine polarity and amplitude for the proper quadrant pair. The reference portion of the circuit includes an automatically tuned 90 degree phase shift stabilized by a closed servo loop, to ensure a constant 90 degree phase shift of constant amplitude over a wide frequency range.

The phase meter utilizes readily available components arranged in a novel manner to achieve the desired results, the complete apparatus being compact and readily portable. Sine wave voltages over a wide frequency range can be handled and, if the waveforms are distorted, identical low pass filters can be inserted at inputs 12 and 14 to eliminate harmonics.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. A direct reading, 360 degree phase meter, comprising: a signal input of sine wave voltage of known frequency and unknown phase; a reference input of sine wave voltage of similar frequency and known phase; phase shifting means connected to said reference input and providing a 90 degree phase shifted voltage of known phase; phase inverting means connected to said signal input and providing a 180 degree phase shifted voltage of unknown phase; a first phase comparator connected to receive and compare the signal voltage, the 180 degree phase shifted voltage and the 90 degree phase shifted voltage; said phase comparator providing a first D.C. output voltage varying in polarity and amplitude relative to the phase difference of the compared voltages; a second phase comparator connected to receive and compare the reference voltage, the signal voltage and the 180 degree phase shifted voltage; said second phase comparator providing a second D.C. output voltage varying in polarity relative to the phase difference of the compared voltages; indicating means having four quadrant portions; said first D.C. output voltage being applied to two pairs of said quadrant portions, whereby the polarity thereof determines in which pair of quadrants the unknown phase angle is contained and the amplitude thereof determines the position in a quadrant portion; and selective means coupled to said pair of quadrant portions and actuated by said second D.C. output voltage, whereby the polarity thereof determines which quadrant of a particular pair contains the required phase angle.

2. A direct reading, 360 degree phase meter, comprising: a signal input and a reference input; a source of sine wave signal voltage connected to said signal input; a source of sine wave reference voltage of known phase and of similar frequency to said signal voltage connected to said reference input; a voltage limiter connected to said reference input and providing a square wave voltage of known phase; phase shifting means connected to said reference input and providing a 90 degree phase shifted voltage; a voltage limiter connected to said signal input and providing a square wave voltage of unknown phase; a phase inverter coupled to said last voltage limiter and providing a phase shifted voltage 180 degrees out of phase with the signal voltage; a first phase comparator connected to receive the square wave voltage of unknown phase, the 180 degree phase shifted voltage and the 90 degree phase shifted voltage of known phase; said first phase comparator providing a first D.C. output voltage varying in polarity and amplitude relative to the phase difference of the compared voltages; a second phase comparator connected to receive the square wave voltage of known phase, the square wave voltage of unknown phase and the 180 degree phase shifted voltage; said second phase comparator providing a second D.C. output voltage varying in polarity relative to the phase difference of the last compared voltages; indicating means having four quadrant portions; said first D.C. output voltage being applied to two pairs of said quadrant portions, whereby the polarity of the voltage determines in which pair of quadrants the unknown phase angle is contained and the amplitude thereof determines the position in a quadrant; and selective means coupled to said pairs of quadrants and actuated by said second D.C. output voltage, whereby the polarity thereof determines which quadrant of a particular pair contains the required phase angle.

3. A direct reading, 360 degree phase meter according to claim 2, wherein said first mentioned phase shifting means includes a 90 degree phase shifter having a tunable portion; phase inverting means connected to said reference input and providing a voltage 180 degrees out of phase with the reference voltage; a phase comparator connected to receive and compare the reference voltage, the 90 degree phase shifted voltage and the 180 degree phase shifted voltage; said phase comparator having a D.C. output voltage varying in polarity and amplitude relative to phase angle variations between the compared voltages; said tunable portion being connected for actuation by said D.C. output voltage in a closed servo loop to maintain a constant 90 degree phase shift.

4. A direct reading, 360 degree phase meter according to claim 2 and including a pair of lamps operatively mounted to illuminate the pairs of quadrant portions selectively; said lamps being coupled to said selective means to illuminate the particular pair of quadrant portions in which the desired phase angle appears.

5. In a direct reading, 360 degree phase meter for indicating the phase difference between an input signal and a reference signal, the combination comprising: means for producing a comparison signal that is 90 degrees out of phase with said reference signal; first phase comparator means for comparing said input signal with said comparison signal, and producing a first D.C. output signal indicating a first pair of quadrants which include said phase of said input signal; second phase comparator means for comparing said input signal with said reference signal, and producing a second D.C. output signal indicating a second pair of quadrants which include said phase of said input signal; phase indicating means; means for connecting a first output terminal for said first D.C. output signal to said phase indicating means; switching means; means for applying said second D.C. output signal to said switching means; and means for connecting a second output terminal for said first D.C. output signal through said switching means to said phase indicating means.

6. The combination of claim 5 including means, energized by said switching means, for illuminating the portion of said indicating means containing the indicated phase angle.

7. In a direct reading, 360 degree phase meter that indicates the phase difference between an input signal and a reference signal, the combination comprising: means for producing a comparison signal that is 90 degrees out of phase with said reference signal; first phase comparator means for comparing said input signal with said comparison signal, and producing a first D.C. output signal indicating a first pair of quadrants which include said phase of said input signal; second phase comparator means for comparing said input signal with said reference signal, and producing a second D.C. output signal indicating a second pair of quadrants which include said phase of said input signal; a phase indicator with first and second input terminals connected to said first pair of quadrants, and with third and fourth input terminals connected to said second pair of quadrants; means for connecting a first output terminal for said first D.C. output signal to said first and second input terminals of said phase indicator; switching means; means for applying said second D.C. output signal to said switching means; and means for connecting a second output terminal for said first D.C. output signal through said switching means to said third or fourth input terminals of said phase indicator.

References Cited in the file of this patent

UNITED STATES PATENTS

| | | |
|---|---|---|
| 2,476,977 | Hansel | July 26, 1949 |
| 2,557,900 | Wallace | June 19, 1951 |
| 2,751,554 | Schlesinger | June 19, 1956 |
| 2,760,155 | Kelly | Aug. 21, 1956 |

OTHER REFERENCES

"Instant Reading Direction Finder," article in Electronics, April, 1948.